United States Patent
Rodi

(10) Patent No.: US 8,348,045 B2
(45) Date of Patent: Jan. 8, 2013

(54) DEVICE FOR TRANSPORTING FLAT OBJECTS

(75) Inventor: Wolfgang Rodi, Laupheim/Baustetten (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 220 days.

(21) Appl. No.: 12/871,438

(22) Filed: Aug. 30, 2010

(65) Prior Publication Data

US 2011/0056800 A1    Mar. 10, 2011

(30) Foreign Application Priority Data

Sep. 9, 2009   (EP) ..................................... 09169810

(51) Int. Cl.
 *B65G 47/36* (2006.01)
 *B65G 17/32* (2006.01)
(52) U.S. Cl. .................. 198/465.4; 198/681; 198/803.9
(58) Field of Classification Search .................. 198/817, 198/465.4, 681, 803.2, 803.7, 803.9
See application file for complete search history.

(56) References Cited

U.S. PATENT DOCUMENTS

| | | | | |
|---|---|---|---|---|
| 3,407,563 A | * | 10/1968 | Dieter et al. ................... | 53/398 |
| 3,894,630 A | * | 7/1975 | Shank, Jr. .................. | 198/470.1 |
| 4,032,280 A | * | 6/1977 | Roberts ......................... | 425/383 |
| 5,407,315 A | * | 4/1995 | Suga .............................. | 414/564 |
| 7,954,623 B2 | * | 6/2011 | Helm ......................... | 198/468.4 |
| 2003/0029700 A1 | * | 2/2003 | Miller ........................ | 198/803.7 |
| 2005/0269188 A1 | * | 12/2005 | Hartness et al. .............. | 198/697 |

FOREIGN PATENT DOCUMENTS

DE    102005046603 A1    4/2007

OTHER PUBLICATIONS

European Search Report for EP09169810—Feb. 11, 2010.

* cited by examiner

*Primary Examiner* — Gene Crawford
*Assistant Examiner* — Keith R Campbell
(74) *Attorney, Agent, or Firm* — Brinks Hofer Gilson & Lione

(57) ABSTRACT

The device for transporting flat objects from an output unit to an input unit has a conveyor belt with several pairs of flaps to transport flat objects in suspended fashion. A feed unit serves to convey the flat objects into the flaps from below. Each flap has a first side piece and a second side piece, which define an intermediate space for holding an edge section of the flat object. The first side pieces and the second side pieces of the flaps of each pair of flaps face each other. Each flap can be pivoted between an open position for picking up and releasing the flat object and a closed position for transporting the flat objects.

16 Claims, 8 Drawing Sheets

DEVICE FOR TRANSPORTING FLAT OBJECTS

CROSS-REFERENCE TO RELATED APPLICATIONS

The present patent document claims the benefit of priority to European Patent Application No. EP 09169810.0, filed Sep. 9, 2009, and entitled "DEVICE FOR TRANSPORTING FLAT OBJECTS," the entire contents of each of which are incorporated herein by reference.

FIELD AND BACKGROUND OF THE INVENTION

Devices for transporting flat objects are used in the pharmaceutical industry, for example, to transport blister strips. The device takes the blister strips from an output unit such as a punch press and transports them to an input unit such as a blister shaft.

This type of device for transporting blister strips can be designed as an endless suction belt, for example, in the case of which the blister strips can be transported in a manner suspended from the belt, with the blister pockets hanging downward.

Another device for transporting blister strips, where the blister strips are also suspended from the belt but where the blister pockets face upward, is known from DE 10 2005 046 603 A1. In the case of this transport device, the blister pockets are fit positively into correspondingly designed receptacles in the transport belt and are held in place there by suction.

Common to all transport belts on which the blister strips are held by vacuum is that they are associated with relatively high operating costs. In addition, the exhaust air stream associated with the production of the vacuum and the heat which is generated are highly disadvantageous to the clean-air system often necessary for pharmaceutical products. Finally, if the blister strips are slightly curved, it cannot always be guaranteed that they will be held by suction on the transport belt.

There are also many other different types of mechanical transport devices for the suspended transport of flat objects, but all of these are relatively complicated and require a great deal of maintenance.

BRIEF SUMMARY OF THE INVENTION

It is an object of the present invention to provide a device for transporting flat objects which is simple in design, guarantees secure transport even of slightly curved objects, and comprises high functional reliability.

According to an aspect of the invention, the device for transporting flat objects from an output unit to an input unit comprises a conveyor belt comprising several pairs of flaps for transporting the flat objects in suspended fashion and a feed unit for conveying the flat objects into the flaps from below. Each flap comprises a first side piece and a second side piece, which define an intermediate space for holding an edge section of one of the flat objects. The first side pieces and the second side pieces of the flaps of each pair of flaps face each other, and the flaps are pivotable between an open position for picking up and releasing the flat object and a closed position for transporting the flat object.

In this way, a device for transporting flat objects is created which is simple in design, ensures a completely precise pick-up and release of the objects, and avoids certain disadvantages of the vacuum technique. Because the flaps of a pair pivot in opposite directions, the edge sections of the flat object laid between the two side pieces of each flap are held securely and can be released again easily. With this design, it is even possible to convey flat objects of different sizes (within a certain range of sizes) without any format adaptations.

To arrive at an especially simple mechanical design, the first side piece and the second side piece of each flap form an acute angle.

If the first side piece and the second side piece of a flap form an angle in the range of between 45° and 70°, preferably in the range of between 55° and 60°, it is guaranteed that a minimal pivoting movement of the flaps will be sufficient to ensure optimal functionality.

It is preferable for the second side piece, which projects farther down, to be shorter than the first side piece. This makes it easier for the flat objects to be ejected in the release area of the device.

In an especially preferred embodiment, the first side piece is oriented horizontally, when the device is in the closed position, and assumes an angle in the range of between 20° and 45°, preferably in the range of between 30° and 35° to the horizontal, when the device is in the open, downward-pivoted position. As a result, it is ensured not only that the flat objects will be conveyed securely but also that the flat objects will be ejected from the conveyor belt in a defined manner by the first side pieces of the flaps.

To guarantee that the process of picking up the flat objects and the process of releasing them again occur at predetermined times, the flaps are preferably pivoted by means of cams.

For this purpose, the device preferably comprises a first cam plate, which comprises two height-variable sections for pivoting the flaps.

The height of the first section of the first cam plate in the pick-up area of the device is preferably varied by means of a first cam disk, which is mounted on an externally driven first shaft. In this way, it is possible to have the shaft driven by, for example, the drive of the output unit and thus to guarantee the synchronous operation of the output unit and of the device for transporting flat objects.

Because the flaps must open quickly in the release area of the device, it is advantageous for the height of the second section of the first cam plate to be varied by means of a pneumatic cylinder in the release area of the device.

The flaps can be pivoted in a mechanically simple and nondamaging manner if each flap comprises a first roller, which is laterally offset from the axis of rotation of the flap towards a first side of the flap and which cooperates with the first cam plate of the device.

So that the flap can be returned to its original position, furthermore, it is also preferred that each flap comprise a second roller, which is laterally offset from the axis of rotation of the flap towards a second side of the flap opposite the first side, and that it cooperates with a second cam plate of the device.

The feed unit, which delivers the flat objects from below into the flaps, is, for example, designed as a suction device, which is also controlled by cams.

The height of the suction device is varied preferably by means of a second cam disk, which is mounted on an externally driven second shaft. Ideally, the first shaft and the second shaft are actuated by the same external drive, as a result of which synchronous operation of the pick-up process for the flat objects is achieved.

BRIEF DESCRIPTION OF THE DRAWINGS

Additional features and advantages of the present invention can be derived from the following description, which refers to the drawings.

DETAILED DESCRIPTION OF SPECIFIC EMBODIMENTS

Figure 1:
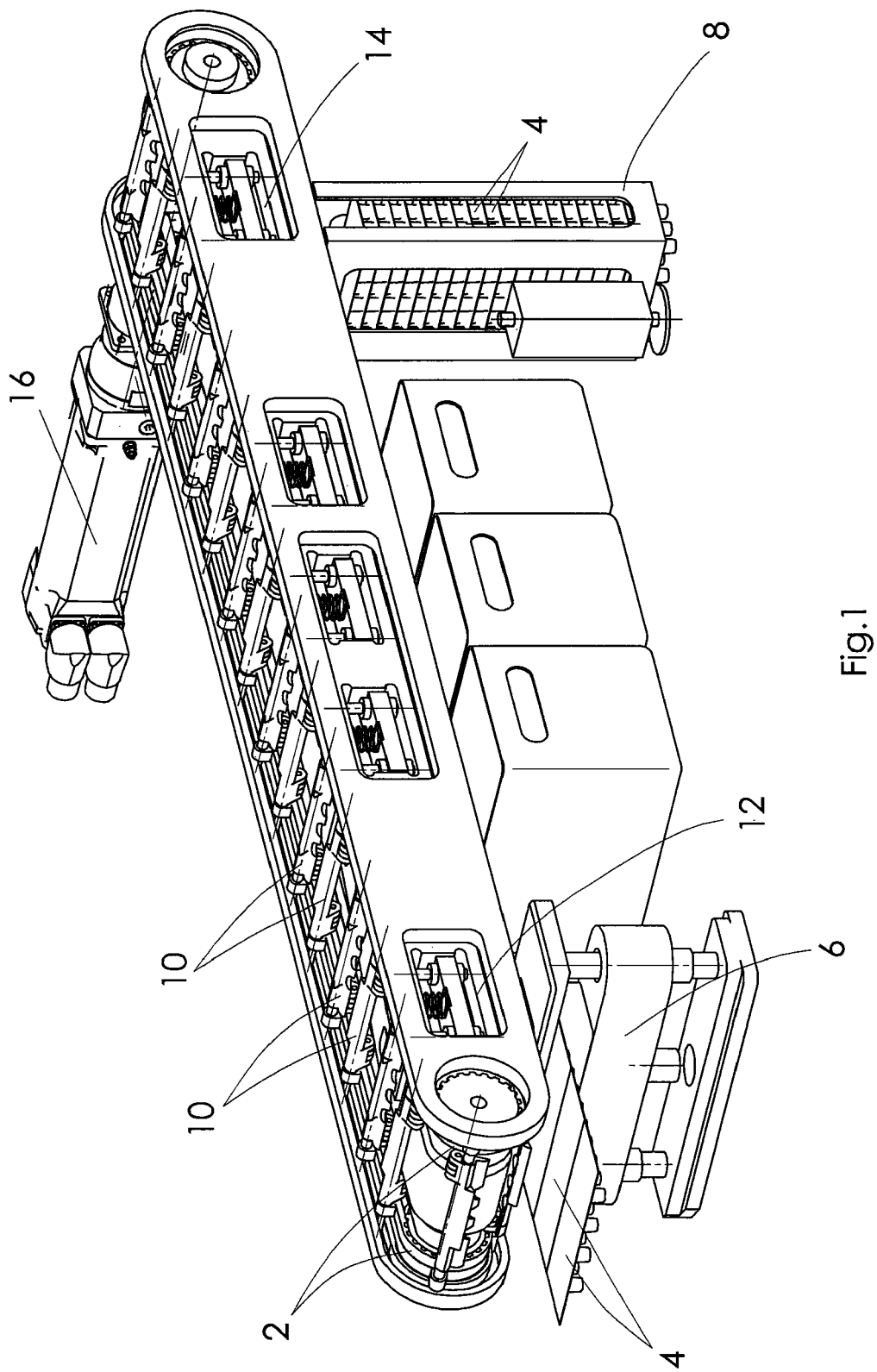
FIG. 1 is a perspective view of an embodiment of the device for transporting flat objects.
Figure 2:
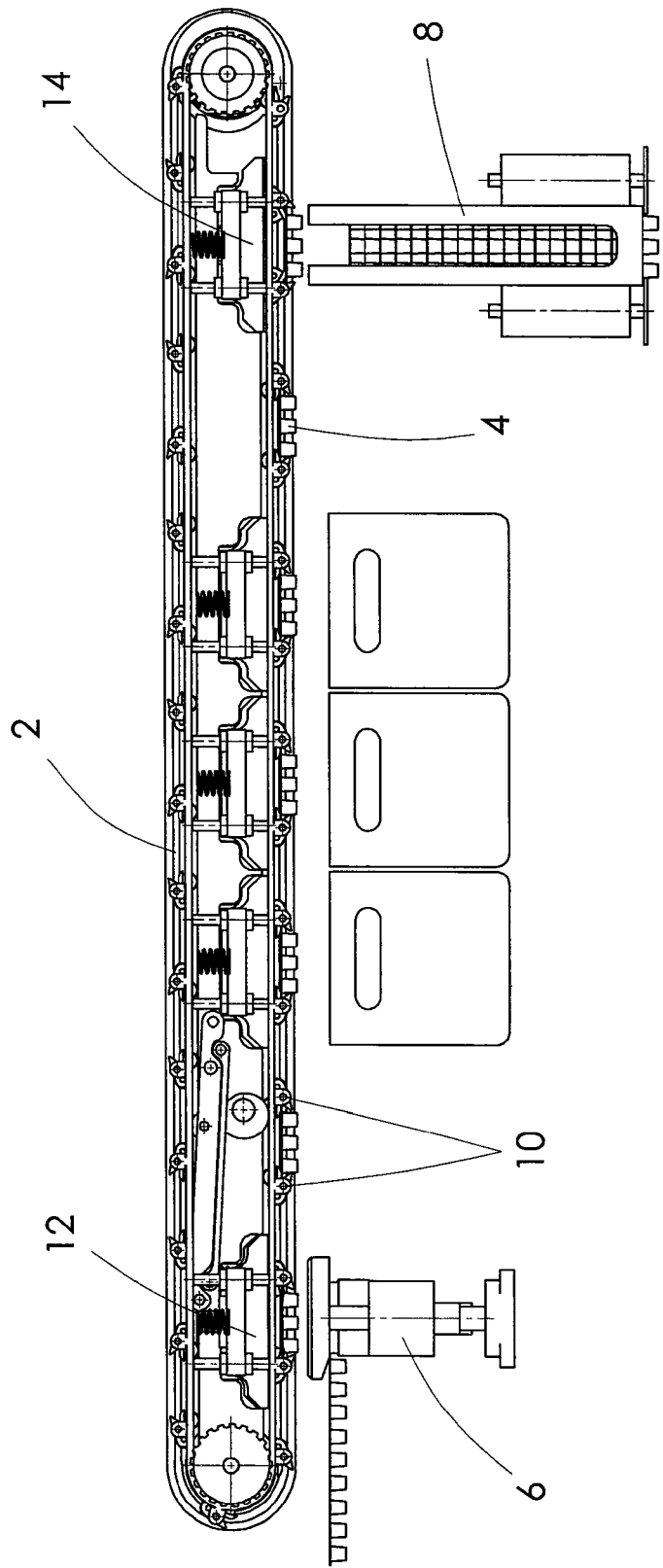
FIG. 2 is a cross-sectional view of the device for transporting flat objects according to FIG. 1.

FIGS. 1 and 2 show an embodiment of a device for transporting flat objects according to the invention. A "flat object" is understood to mean any object which comprises at least flat edge sections.

The device comprises an endless conveyor belt 2, on which flat objects 4, in the present case blister strips, are transported from an output unit 6 (here a punch press for punching out blister strips from a blister web) to an input unit 8 (in the present case, a blister shaft). The conveyor belt 2 comprises a plurality of pairs of flaps 10. Each pair of flaps 10 picks up a flat object 4 in a pickup area 12 of the device and transports the flat object 4 in suspended fashion to a release area 14 of the device, in which the flat object 4 is ejected by the flaps 10. The conveyor belt 2 is for this purpose driven in timed steps by a drive unit 16, wherein the flat objects 4 are transported only on the bottom section of the endless conveyor belt 2. In the example shown here, the conveyor belt 2 travels in the counterclockwise direction.

Figure 3:
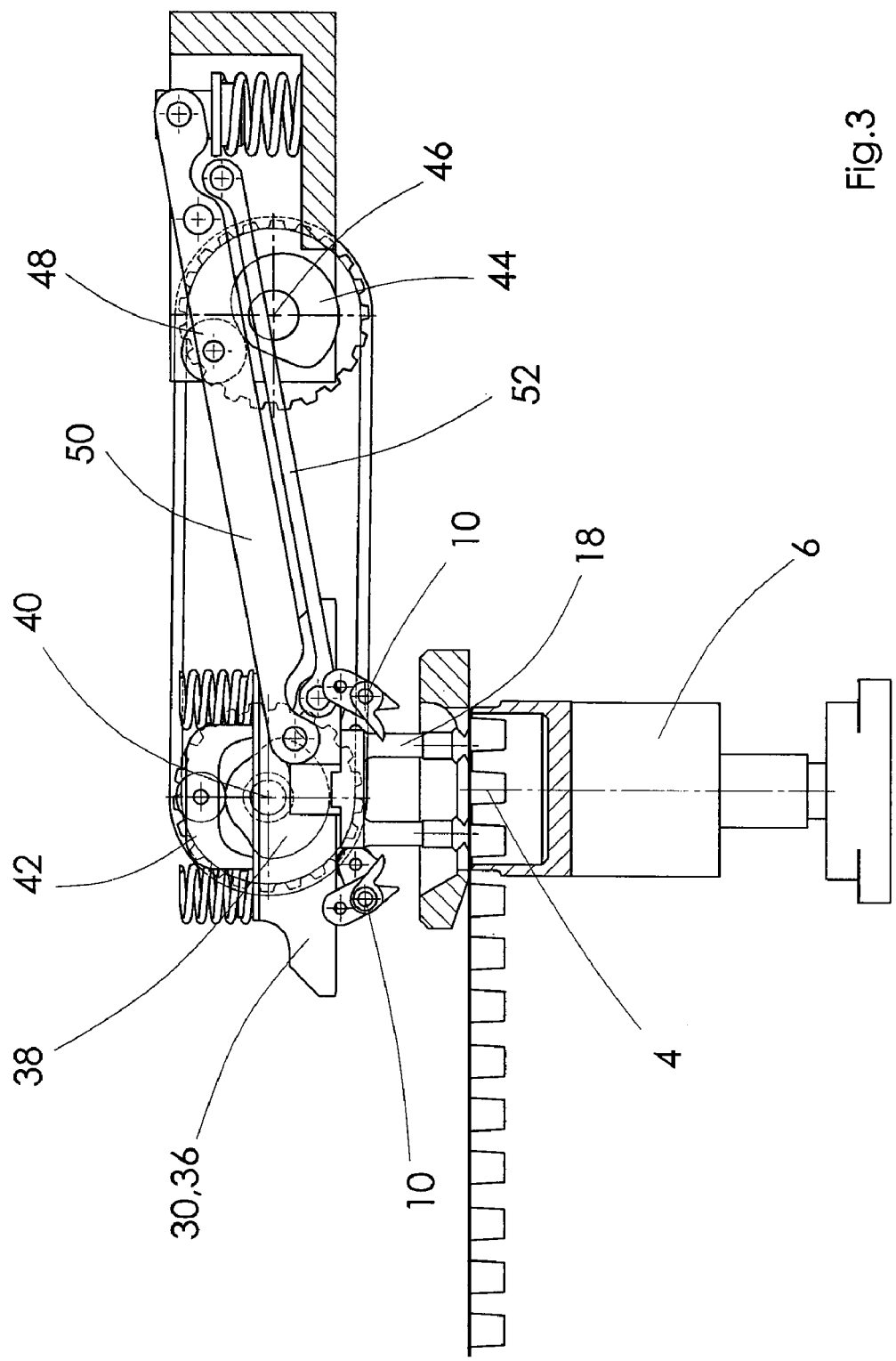
FIG. 3 is an enlarged cross-sectional view of the feed unit and of a pair of flaps in the open position in the pickup area of the device with the associated mechanisms.
Figure 4:
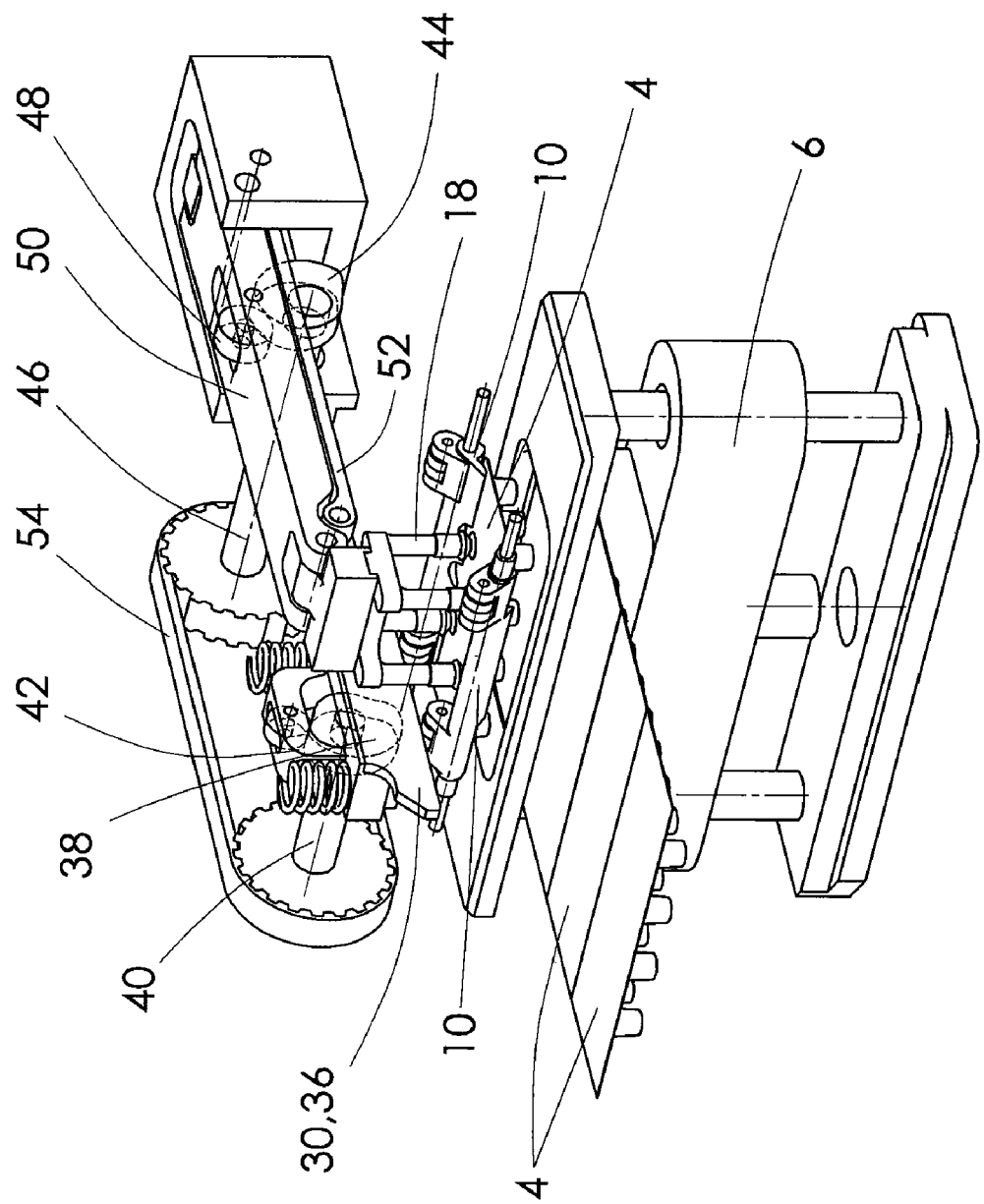
FIG. 4 is a perspective view of the elements of FIG. 3, wherein the feed unit has already lifted the flat object to a certain extent.
Figure 5:
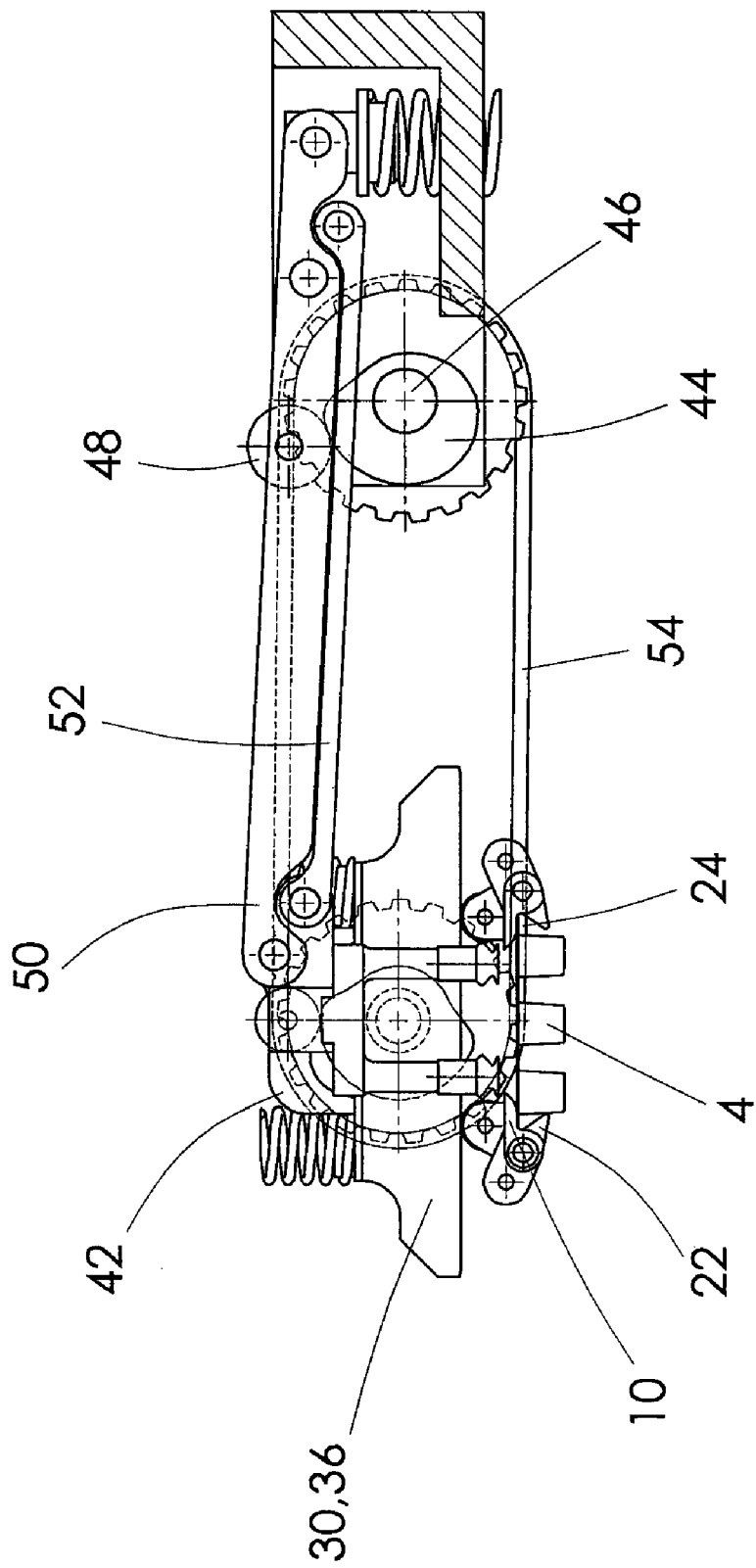
FIG. 5 is a cross-sectional view similar to that of FIG. 3, wherein the feed unit has lifted the flat object all the way and the flaps are in a closed position.

FIGS. 3-5 show the sequence of three steps by which a flat object 4 is picked up from the output unit 6 by a pair of flaps 10. In FIG. 3, a feed unit 18, which, in the present example, is designed as a suction device, is located in a lowered position, in which it can pick up the flat object 4 being provided by the output unit 6. The feed unit 18 is then moved upward, until it moves above the position of FIG. 4 and thus arrives in the position shown in FIG. 5. At the same time, the pair of flaps 10 in FIGS. 3 and 4 is in an open position, whereas the flaps in FIG. 5 have assumed a closed position.

Figure 7:
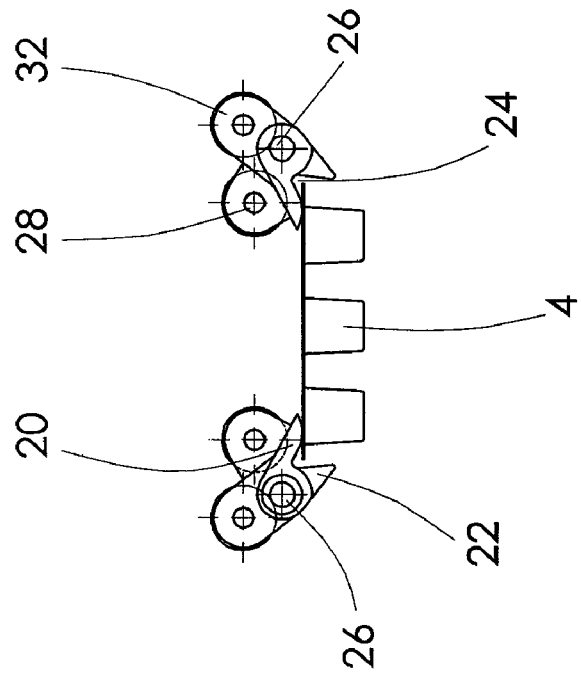
FIG. 7 is a cross-sectional view of the pair of flaps of FIG. 6.
Figure 6:
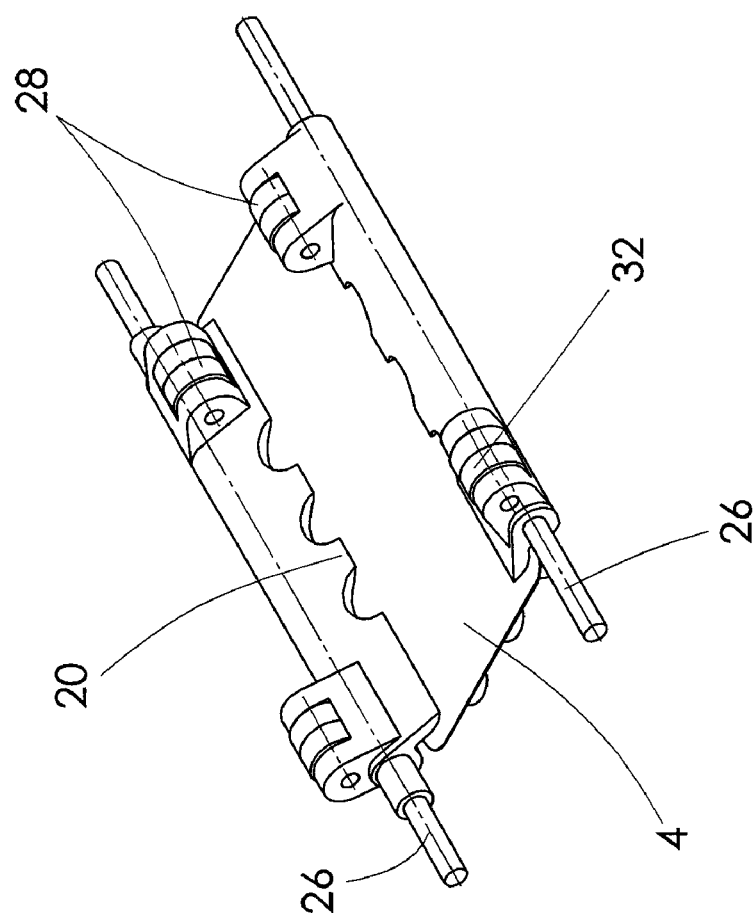
FIG. 6 is an enlarged perspective view of a pair of flaps in the closed position.

FIGS. 6 and 7 show a pair of flaps 10 in the open position. Each flap 10 comprises a first side piece 20 and a second side piece 22. The first side piece 20 and the second side piece 22 of each pair of flaps 10 define an intermediate space 24 for holding an edge section of the flat object 4. The first side pieces 20 of the flaps 10 of each pair of flaps 10 face each other. In the closed position of the flaps 10 shown in FIG. 5, the two second side pieces 22 of the flaps 10 of the pair of flaps 10 are also facing each other.

The flaps 10 can be pivoted around an axis of rotation 26 between the open position for picking up and releasing the flat objects 4 and the closed position for transporting the flat objects 4. The first side piece 20 and the second side piece 22 of a flap 10 form an acute angle, which is preferably in the range of between 45° and 70°, and more preferably in the range of between 55° and 60°. In the preferred embodiment shown here, the second side piece 22 is also shorter than the first side piece 20. In the closed position shown in FIG. 5, the first side piece 20 is oriented horizontally, whereas, in the downward-pivoted open position (FIG. 7), it forms an angle of between 20° and 45°, preferably of between 30° and 35°, to the horizontal. In the closed position shown in FIG. 5, the edge sections of the flat object 4 are held securely in the intermediate space 24 between the first side piece 20 and the second side piece 22 of the two flaps 10 of a pair of flaps 10, wherein the two slanted second side pieces 22 prevent the flat object 4 from sliding or falling down. In the open position shown in FIGS. 6 and 7, however, the second side piece 22 has been pivoted into an essentially vertical position, so that the flat object 4 can be easily picked up from below or released downward.

So that the flaps 10 can be pivoted, it is preferable for each flap 10 to comprise a first roller 28, which is laterally offset to the inside from the axis of rotation 26 of the flap 10 and which is actuated by a first cam plate 30 (see FIG. 4). By the pressure exerted from above onto the first roller 28, the flap 10 is moved into the open position and held there.

Each flap 10 also comprises a second roller 32, which is laterally offset to the outside from the axis of rotation 26 of the flap 10, that is, on the side opposite to that of the first roller 28. The second roller 32 works together with a second cam plate 34 (FIG. 8) of the device and causes the flap 10 to pivot toward the closed position and then holds the flap 10 in this closed position.

The preferred angular relationships indicated above guarantee that even slight rotational movements of the flaps 10 are sufficient to hold the flat object 4 securely in the closed position and to pick up and release the flat object 4 with precision. The shorter design of the second side piece 22 also helps to achieve this goal.

Referring again to FIGS. 3 and 4, it can be seen that a height-variable first section 36 of the first cam plate 30 exerts pressure on the first rollers 28 of the flaps 10 and thus causes the flaps 10 to rotate into their open position.

The height of the first section 36 of the first cam plate 30 is varied by a first cam disk 38, which is mounted on an externally driven first shaft 40. In the embodiment shown here, a moveable anchor 42 rests on the first cam disk 38. This anchor is connected to the first section 36 of the first cam plate 30, and the change in its height is therefore transmitted directly to the first section 36 of the first cam plate 30.

In the closed position of the flaps 10 shown in FIG. 5, the flat object 4 is held securely in the intermediate space 24 between the first side piece 20 and the second side piece 22. For this purpose, the first section 36 of the first cam plate 30 is in an elevated position and does not exert any pressure on the first rollers 28 of the flaps 10.

It is also necessary for the feed unit 18 to move vertically in synchrony with the variation in the height of the first section 36 of the first cam plate 30 and with the associated pivoting movement of the flaps 10. For this purpose, a second cam disk 44 is used, which is mounted on an externally driven second shaft 46. The second cam disk 44 works together with a roller 48, which is supported in a pivotably supported lever 50, at the forward end of which the feed unit 18 is pivotably supported.

To maintain the vertical orientation of the feed unit 18 during the pivoting movement of the lever 50, a parallel guide mechanism 52 is used. The first shaft 40 and the second shaft 46 are preferably operated by the same external drive, which ideally is also the drive of the output unit 6 designed as a punch press. For this purpose, the first shaft 40 and the second shaft 46 can be connected to each other by a toothed belt 54 and then also connected to the drive of the punch press.

The rotational movement of the flaps 10 into the closed position shown in FIG. 5 usually takes place by the exertion of pressure on the second rollers 32 of the flaps 10 by means of a second cam plate 34, which is not shown in FIGS. 3-5 for the sake of clarity. The second cam plate, however, is similar to the cam plate 34 of FIG. 8. It is also possible to provide a torsion spring to ensure that the flaps 10 return to the closed position as soon as the first section 36 of the first cam plate 30 is no longer pressing down on the first rollers 28 of the flaps 10.

Figure 8:
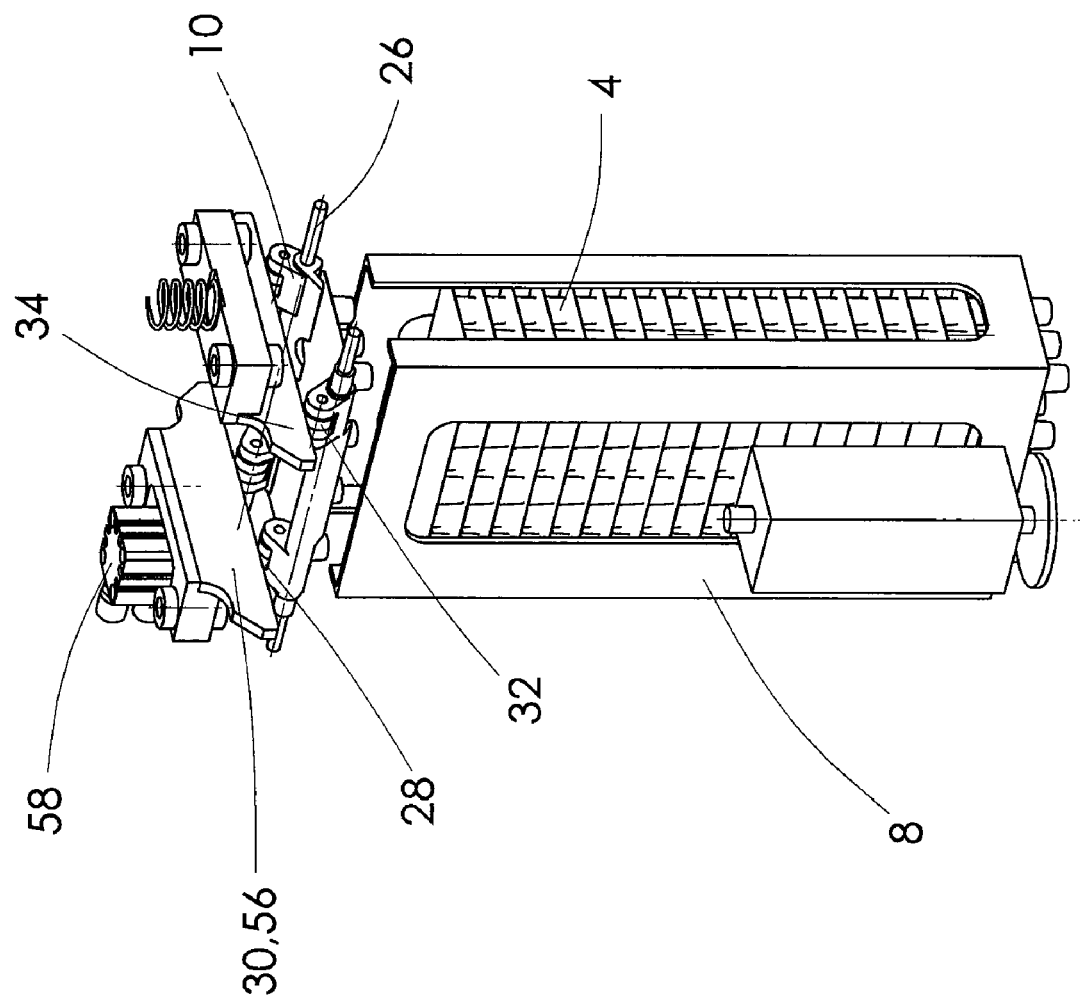
FIG. 8 is a perspective view of a pair of flaps in the release area of the device with the associated mechanisms, wherein the flaps are shown in the open position for releasing the flat object.
Figure 9:
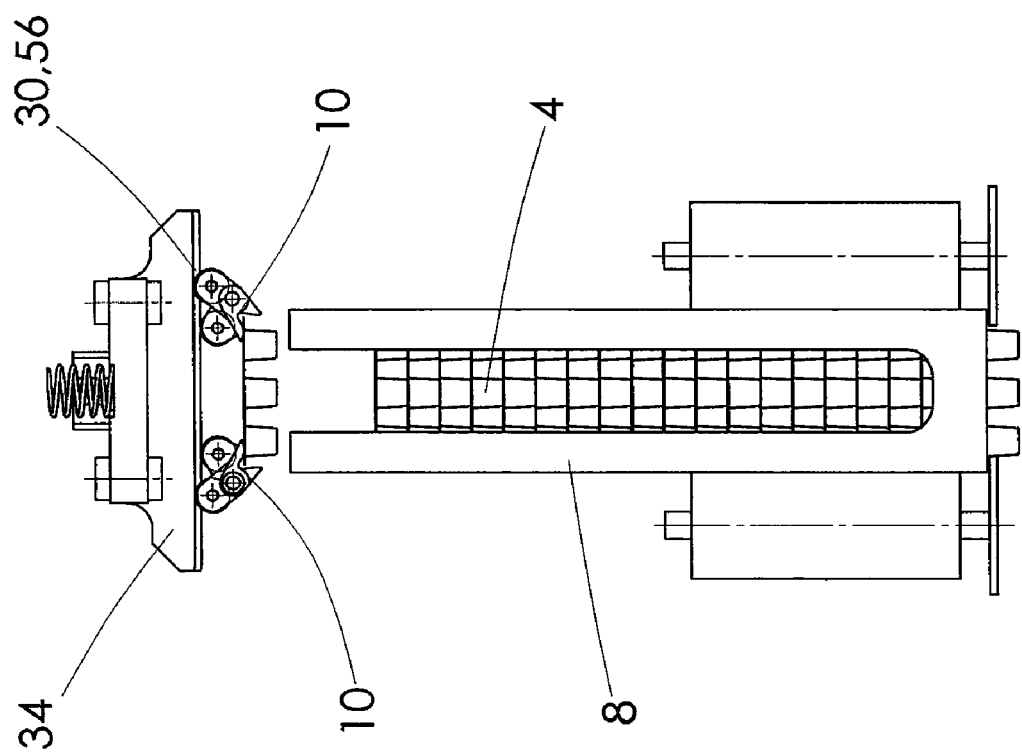
FIG. 9 is a cross-sectional view of the elements of FIG. 8.

In the release area 14 of the device shown in FIGS. 8 and 9, the flat objects are released into an input unit 8, here a blister shaft. For this purpose, a second section 56 of the first cam plate 30 is moved quickly downward by means of a pneumatic cylinder and thus presses down on the first rollers 28 of the flaps 10, pivoting the flaps into the open position and thus releasing the flat object 4 so that it can fall down. Because of the special design of the first side pieces 20 of the flaps 10, these side pieces 20 also eject the flat object 4 uniformly downward, which is especially advantageous in the case of curved blister strips. After the second section 56 of the first cam plate 30 has been lifted again, the second cam plate 34 acts on the second rollers 32 of the flaps 10 and pivots them back into the closed position.

The person skilled in the art can conceive of various ways in which the device for transporting flat objects 4 can be modified. For example, the feed unit 18 can be designed as a gripping mechanism, which is moved in the vertical direction. The height of the feed unit 18 can be varied by a separate drive. The pivoting of the flaps 10, furthermore, can be accomplished by different mechanical means. It is also conceivable that the movement of the flaps 10 in the release area 14 of the device can be controlled mechanically by a cam plate, wherein the pneumatic cylinder 58 is preferred because of its fast response.

The invention claimed is:

1. A device for transporting flat objects from an output unit to an input unit, comprising:
   a conveyor belt comprising several pairs of flaps for transporting the flat objects in suspended fashion; and
   a feed unit for conveying the flat objects into the flaps from below;
   wherein each flap comprises a first side piece and a second side piece which define an intermediate space for holding an edge section of one of the flat objects, and wherein the first side pieces and the second side pieces of the flaps of each pair of flaps face each other, and wherein each flap is pivotable between an open position for picking up and releasing the flat object and a closed position for transporting the flat object;
   wherein the flaps are pivotable by means of a first cam plate, which comprises first and second height-variable sections for pivoting the flaps, and wherein a height of the first section of the first cam plate in a pickup area of the device is changeable by a first cam disk, which is mounted on an externally driven first shat.

2. The device according to claim 1, wherein the first side piece and the second side piece of each flap form an acute angle.

3. The device according to claim 2, wherein the first side piece and the second side piece of each flap form an angle in the range of between 45° and 70°.

4. The device according to claim 3, wherein the first side piece and the second side piece of each flap form an angle in the range of between 55° and 60°.

5. The device according to claim 1, wherein the second side piece of each flap is shorter than the first side piece.

6. The device according to claim 1, wherein the first side piece, when in the closed position, is oriented horizontally, and when in the downward-pivoted, open position forms an angle in the range of between 20° and 45° to the horizontal.

7. The device according to claim 6, wherein the first side piece, when in the open position, forms an angle in the range of between 30° and 35° to the horizontal.

8. The device according to claim 1, wherein a height of the second section of the first cam plate in a release area of the device is changeable by a pneumatic cylinder.

9. The device according to claim 1, wherein each flap comprises a first roller, which is laterally offset from an axis of rotation of the flap towards a first side of the flap and cooperates with the first cam plate.

10. The device according to claim 9, wherein each flap comprises a second roller, which is laterally offset from the axis of rotation of the flap towards a second side of the flap opposite the first side of the flap, and cooperates with a second cam plate of the device.

11. The device according to claim 1, wherein the feed unit is a suction device.

12. The device according to claim 1, wherein the feed unit is cam-controlled.

13. The device according to claim 12, wherein a height of the feed unit is changeable by a second cam disk, which is mounted on an externally driven second shaft.

14. A device for transporting flat objects from an output unit to an input unit, comprising:
   a conveyor belt comprising several pairs of flaps for transporting the flat objects in suspended fashion;
   a feed unit for conveying the flat objects into the flaps from below;
   wherein each flap comprises a first side piece and a second side piece, which define an intermediate space for holding an edge section of one of the flat objects, and wherein the first side pieces and the second side pieces of the flaps of each pair of flaps face each other, and wherein each flap is pivotable between an open position for picking up and releasing the flat object and a closed position for transporting the flat object;
   wherein the flaps are pivotable by means of a first cam plate, which comprises first and second height-variable sections for pivoting the flaps, and wherein each flap comprises a first roller, which is laterally offset from an axis of rotation of the flap towards a first side of the flap and cooperates with the first cam plate, and wherein each flap comprises a second roller, which is laterally offset from the axis of rotation of the flap towards a second side of the flap opposite the first side of the flap, and cooperates with a second cam plate of the device.

15. A device for transporting blister strips from an output unit to an input unit, comprising:
   a conveyor belt comprising several pairs of flaps for transporting the blister strips in suspended fashion;
   a feed unit for conveying the blister strips into the flaps from below;
   wherein each flap comprises an upper side piece and a lower side piece, which define an intermediate space for holding an edge section of one of the blister strips, and wherein the upper side pieces and the lower side pieces of the flaps of each pair of flaps face each other, and wherein each flap is pivotable between an open position for picking up and releasing the blister strip and a closed position for transporting the blister strip, and wherein the upper side piece and the lower side piece of each flap form an acute angle in the range of between 45° and 70°; and wherein the upper side piece, when in the closed position, is oriented horizontally, and when in the downward-pivoted, open position forms an angle in the range of between 20° and 45° to the horizontal.

16. The device according to claim 15, wherein the upper side piece and lower side piece of each flap moves simultaneously between the open and closed positions to maintain their relative angular position.

* * * * *